United States Patent
Ahn et al.

(10) Patent No.: US 7,809,779 B2
(45) Date of Patent: Oct. 5, 2010

(54) METHOD OF CREATING SYMBOLIC LINK CAPABLE OF BEING COMPATIBLE WITH FILE SYSTEM, AND METHOD AND APPARATUS FOR ACCESSING FILE OR DIRECTORY BY USING SYMBOLIC LINK

(75) Inventors: Hyun-joo Ahn, Suwon-si (KR); Moon-sang Kwon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 137 days.

(21) Appl. No.: 11/637,030

(22) Filed: Dec. 12, 2006

(65) Prior Publication Data

US 2007/0162419 A1     Jul. 12, 2007

(30) Foreign Application Priority Data

Jan. 11, 2006     (KR) ...................... 10-2006-0003324

(51) Int. Cl.
*G06F 12/00*     (2006.01)
(52) U.S. Cl. .................... 707/828; 707/829; 707/831
(58) Field of Classification Search ................ 707/200, 707/828, 829, 831
See application file for complete search history.

(56) References Cited

U.S. PATENT DOCUMENTS

| | | | |
|---|---|---|---|
| 5,832,527 A | 11/1998 | Kawaguchi | |
| 5,905,990 A | 5/1999 | Inglett | |
| 6,327,703 B1 | 12/2001 | ODonnell et al. | |
| 6,856,989 B1 | 2/2005 | Zhou et al. | |
| 2002/0143795 A1 | 10/2002 | Fletcher et al. | |
| 2005/0076041 A1 | 4/2005 | Stakutis et al. | |

FOREIGN PATENT DOCUMENTS

| | | |
|---|---|---|
| JP | 5-100922 A | 4/1993 |
| JP | 7-56781 A | 3/1995 |
| KR | 2000-0022988 A | 4/2000 |
| KR | 2000-0077406 A | 12/2000 |
| KR | 10-2001-0090667 A | 10/2001 |
| KR | 10-2005-0013961 A | 2/2005 |

OTHER PUBLICATIONS

"Symbolic Link", Wikipedia, Jan. 2006, pp. 1-3, XP 002567173.
"Computer Shortcuts", Wikipedia, Dec. 2005, pp. 1, XP 002567174.

*Primary Examiner*—Hung T Vy
*Assistant Examiner*—Michael Le
(74) *Attorney, Agent, or Firm*—Sughrue Mion, PLLC

(57) ABSTRACT

Provided are a method and apparatus for supporting a symbolic link at an application level while keeping the structure of an existing file system that does not support a symbolic link. The method includes receiving a symbolic link creation command including an absolute path and a symbolic link path from a user, creating a symbolic link file for the symbolic link path when the absolute path exists but the symbolic link path does not exit, and changing a value of a specified field of a directory entry of the created symbolic link file to a specified value representing the symbolic link.

18 Claims, 5 Drawing Sheets

10

| File Name | sybolic_link |
|---|---|
| Attribute | archive |
| Created Time | 09:43:22 |
| Created Date | 2006-01-03 |
| . | . |
| . | . |
| . | . |
| File Size | 23 bytes |

20

| File Name | sybolic_link |
|---|---|
| Attribute | archive |
| Created Time | 00:00:00 |
| Created Date | 1980-01-01 |
| . | . |
| . | . |
| . | . |
| File Size | 2064 bytes |

METHOD OF CREATING SYMBOLIC LINK CAPABLE OF BEING COMPATIBLE WITH FILE SYSTEM, AND METHOD AND APPARATUS FOR ACCESSING FILE OR DIRECTORY BY USING SYMBOLIC LINK

CROSS REFERENCE TO RELATED APPLICATION

This application claims priority from Korean Patent Application No. 10-2006-0003324 filed on Jan. 11, 2006 in the Korean Intellectual Property Office, the disclosure of which is incorporated herein by reference in its entirety.

BACKGROUND OF THE INVENTION

1. Field of the Invention

Apparatuses and methods consistent with the present invention relate to a file system, and more particularly, to a method and apparatus for supporting a symbolic link at an application level while keeping the structure of an existing file system that does not support a symbolic link.

2. Description of the Related Art

An operating system (OS) uses a file system so as to manage data on a system, in which the OS is installed. The file system is a logical structure that should be constructed first so as to manage files. For example, in Microsoft Windows, a format command is used to create and initialize the file system. After the file system is created, a user can store or delete the files.

Various file systems exist according to the operating system. For example, there are various file systems, such as FAT (File Allocation Table) system or NTFS (New Technology File System) in operating systems of Windows series, and UFS (Unix File System), EXT2 (Extended 2), EXT3 (Extended 3), and JFS (Journaling File System) in operating systems of Unix/Linux series. Each of the file system provides additional functions, such as data encryption or data compression.

A file system for storing and managing files is broadly divided into two regions, that is, a data region and an information region. In the data region, actual data of a file is stored. In the information region, information of the corresponding file is stored. The attribute, authority, name, and position information of the file are stored in the information region.

In the operating systems of Unix/Linux series or NTFS, a separate field exists in the file system for supporting a symbolic link. Therefore, an application on the basis of the above-described file system can easily use the symbolic link. A symbolic link is a special kind of file that points to a file or directory, and a user can use the symbolic link as an original file or directory. Gaining access to the file or directory through a long path name can be accomplished by simply creating a symbolic link with respect to the path and using the symbolic link as an actual file or directory. However, a file system of the FAT series, such as FAT12, FAT16, or FAT32, does not have a separate field for supporting a symbolic link.

A mobile device, such as a cellular phone, a PDA (Personal Digital Assistant), a PMP (Portable Multimedia Player), an MP3 player, or a USB memory stick, which recently comes into the spotlight, adopts the file system of the FAT series. However, since the file system of the FAT series does not support a symbolic link, gaining access to data (file or directory) should be made through a long path name.

If a file system is not designed to support a symbolic link, a value for the symbolic link is not allocated in a field that represents the file attribute. Accordingly, a symbolic link cannot be used in such a file system. In the file system where the symbolic link cannot be used, it is difficult to use a file because a user is required to use a long path name when the user wants to access a file or directory having a long path name. If a file attribute field is arbitrarily changed and used in order to use a symbolic link function, compatibility of the file system may be degraded. Accordingly, there is a need to provide a symbolic link function while the structure or compatibility of the existing file system is preserved.

SUMMARY OF THE INVENTION

An object of the invention is to support a symbolic link function while maintaining the compatibility of an existing file system, and in particular, to allow a file system, which does not support a symbolic link, to use a symbolic link function, to reduce inconvenience when a user accesses a file or directory through an absolute path (a long path name).

Aspects of the invention are not limited to those mentioned above, and other aspects of the invention will be apparently understood by those skilled in the art through the following description.

According to an aspect of the invention, a method of creating a symbolic link, which can keep compatibility with a file system having no symbolic link identification field, includes receiving a symbolic link formation command including an absolute path and a symbolic link path from a user, creating a symbolic link file for the symbolic link path as content when the absolute path exists but the symbolic link path does not exist; and changing a value of a specified field of a directory entry of the created symbolic link file to a specified value representing the symbolic link.

According to another aspect of the invention, a method of accessing a file or directory using a symbolic link, which is created so as to keep compatibility with a file system having no symbolic link identification field, includes receiving an access command to a certain path from a user; judging whether or not a value recorded in a specified field of a directory entry with respect to a file or directory corresponding to the path is consistent with a specified value representing a symbolic link, converting the path into a converted path included in a content of the file or directory if it is judged that the value recorded in the specified field of the directory entry is consistent with the specified value representing the symbolic link, and accessing a file or directory corresponding to the converted path.

According to another aspect of the invention, an apparatus for accessing a file or directory using a symbolic link, which is created so as to keep compatibility with a file system having no symbolic link identification field, includes a user command input unit which receives an access command to a certain path from a user, an attribute reading unit which judges whether or not a value recorded in a specified field of a directory entry with respect to a file or directory corresponding to the path is consistent with a specified value representing a symbolic link, a path converting unit which converts the path into a converted path included in a content of the file or directory if the value recorded in the specified field of the directory entry is consistent with the specified value representing the symbolic link, and a control unit which accesses a file or directory corresponding to the converted path.

BRIEF DESCRIPTION OF THE DRAWINGS

The above and other aspects of the invention will become more apparent by describing in detail exemplary embodiments thereof with reference to the attached drawings, in which.

DESCRIPTION OF THE EXEMPLARY EMBODIMENTS

Figure 1:
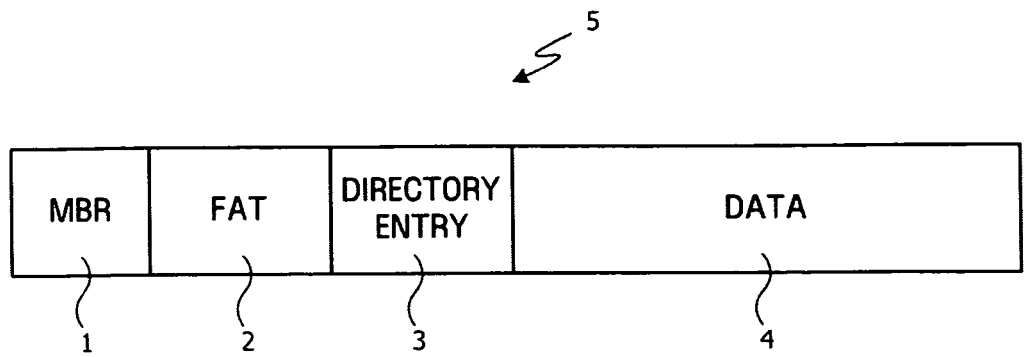
FIG. 1 is a diagram showing the schematic configuration of an FAT file system.

Aspects of the invention and methods of accomplishing the same may be understood more readily by reference to the following detailed description of exemplary embodiments and the accompanying drawings. The invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the invention will only be defined by the appended claims. Like reference numerals refer to like elements throughout the specification.

FIG. 1 is a diagram showing the schematic configuration of an FAT file system 5. The FAT file system 5 includes an MBR (Master Boot Record) region 1, an FAT region 2, a directory entry region 3, and a data region 4. The MBR region 1, the FAT region 2, and the directory entry region 3 are included in an information region of the FAT file system 5. In the directory entry region 3, a directory entry is recorded for each directory or file.

Figure 2:
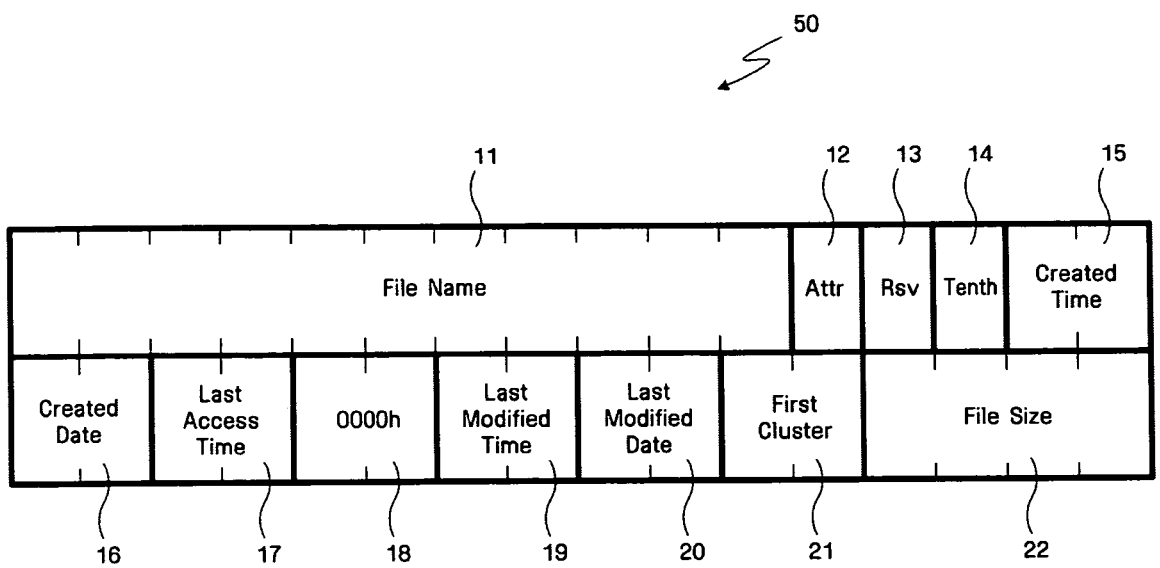
FIG. 2 is a diagram showing the structure of a directory entry in an FAT file system.

A structure of a known directory entry 50 will be described with reference to FIG. 2. In FIG. 2, one mark corresponds to one byte. Therefore, the directory entry 50 may be 32 bytes.

In a file name field 11, a name and an extension of the corresponding directory or file are recorded. In the file name field 11, eleven bytes, that is, eight bytes for the name and three bytes for the extension, are allocated. In this case, a short name is used. In order to use a long name, another field is used, in addition to the 32 bytes.

In an attribute field 12, an attribute of the corresponding directory or file is recorded. The attribute indicates whether or not a file is a document file (ATTR_ARCHIVE), whether or not a file is a read only file (ATTR_READ_ONLY), whether or not a file is a system file (ATTR_SYSTEM), whether or not a file is a hidden file (ATTR_HIDDEN), whether or not a file is a directory file (ATTR_DIRECTORY), or whether or not a disk volume ID exists (ATTR_VOLUME_ID).

A reserved field 13 is a field reserved by Microsoft Windows NT.

In a tenth field 14, a count of 1/10 second is recorded. The available value ranges from 0 to 199.

In a created time field 15, a time at which a directory or file is created is recorded. In the created time field, 2 bytes (16 bits) are allocated. Of these, in the 0th to 4th bits, a count of 2 seconds is recorded, and the count has an effective value ranging from 0 to 29. A minute is recorded in the 5th to 10th bits and has an effective value ranging from 0 to 59. An hour is recorded in the 11th to 15th bits and has an effective value ranging from 0 to 23. Accordingly, a total time ranges from 00:00:00 to 23:59:58.

In a created date field 16, a date on which a directory or file is created is recorded. In the created data field 16, 2 bytes are allocated. A day is recorded in the 0th to 4th bits and has an effective range of 1 to 31. A month is recorded in the 5th to 8th bits and has an effective range of 1 to 12. A year is recorded in the 9th to 15th bits and has an effective range of 0 to 127. When the year is 0, it means 1980 and, when the year is 127, it means 2107.

In a last access time field 17, a time at which the corresponding directory or file is last accessed (read or written) is recorded. A time recording method is the same as that in the created time field 15.

In a field 18, a high word of a start cluster number is recorded. The value of the field 18 always holds "0" in the FAT12 or FAT16.

In a last modified time field 19, a time at which the corresponding directory or file is last modified is recorded. A time recording method is the same as that in the created time field 15.

In a last modified date field 20, a date on which the corresponding directory or file is last modified is recorded. A date recording method is the same as that in the created date field 16.

In a file size field 22, a size of the corresponding file is recorded on the basis of a byte.

As described above, in the directory entry of the known FAT file system, there is no field representing whether or not the corresponding file is a symbolic link file. However, if a separate attribute or field is added to the FAT file system, compatibility with the known FAT file system may be lost.

Therefore, in the invention, if one field among the fields shown in FIG. 2 has a prescribed value, it is understood that the field does not represent the original meaning of the field but indicates whether or not the corresponding file is a symbolic link file. To this end, in the invention, any one of the created date, created time, and the size of the file is used as a reference of the analysis.

Generally, unlike the last accessed time or last modified time of the file, the created date/time of the file is not modified after creation. Even though the created date/time of the file has an incorrect value, it has little effect on the corresponding file. Therefore, in the invention, when the created date/time of the file has a specified time value, it is judged that the corresponding file is a symbolic link file.

The specified time value can be arbitrarily determined but it is desirable to select a value that is unlikely to appear normally. For example, a file having the created date and time represented as 1980-01-01 and 00:00:00 can be regarded as a symbolic link file. Of course, the file can be regarded as a symbolic link file by using one of the created date and time. However, in order to increase identification accuracy, it is desirable to use both the created date and time.

However, the created date/time of a file that is not indicative of a symbolic link file may have a specified value in accordance with various causes, such as a system error and so on. In order to avoid such a case, a file size is additionally used to identify a symbolic link file in the invention. In this exemplary embodiment, if the created date/time of a file has a specified time value and a file size also has a specified value, the corresponding file is regarded as a symbolic link file.

The specified value of the file size can be arbitrarily determined but it is desirable to use the same value with respect to all of the symbolic link files, regardless of actual file sizes of the symbolic link files. For example, the specified value of the file size can be determined as a file size (for example, 2064 bytes in case of FAT) when the symbolic link file has the longest path in the corresponding file system.

Figure 3:
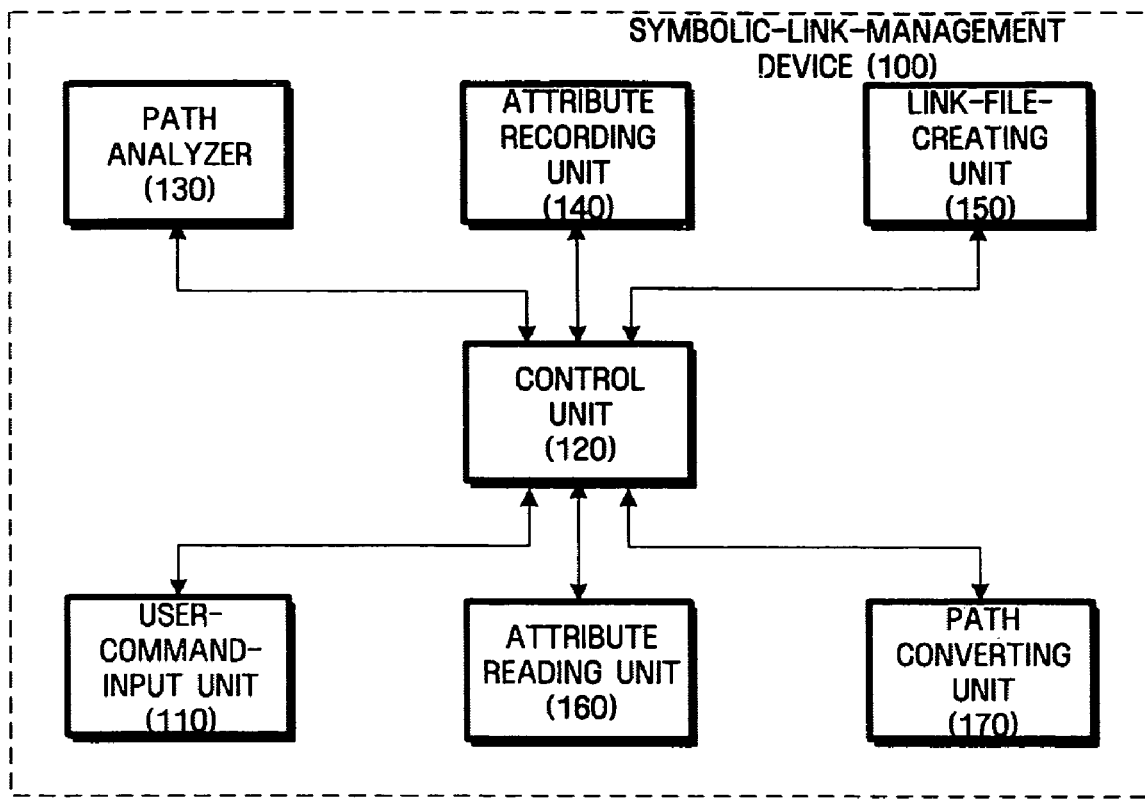
FIG. 3 is a block diagram showing the configuration of a symbolic link management device according to an exemplary embodiment of the invention.

FIG. 3 is a block diagram showing the configuration of a symbolic link management device 100 according to an exemplary embodiment of the invention. The symbolic link management device 100 includes a user command input unit 110, a control unit 120, a path analyzer 130, an attribute recording unit 140, a link file creating unit 150, an attribute reading unit 160, and a path converting unit 170.

When a user inputs a symbolic link creation command or there is a symbolic link created, the user command input unit 110 receives an access (read or write) command with respect to a specified file or directory using the symbolic link. The symbolic link creation command includes a symbolic link path and an absolute path corresponding to the symbolic link path.

The path analyzer 130 analyzes the symbolic link path received from the user and the absolute path indicated by the symbolic link. The path analyzer 130 also checks whether or not a file or directory corresponding to the analyzed path name exists.

The link file creating unit 150 creates a symbolic link file according to the input symbolic link creation command. For example, a symbolic link file 70 may have a structure shown in FIG. 4.

A symbolic link file having a symbolic link path 71 indicated as "/symbolic_link" (a file "symbolic_link" under a root directory) has a content of "/test/case/originalpath" which is an absolute path 72 corresponding to the symbolic link path.

Figure 5:
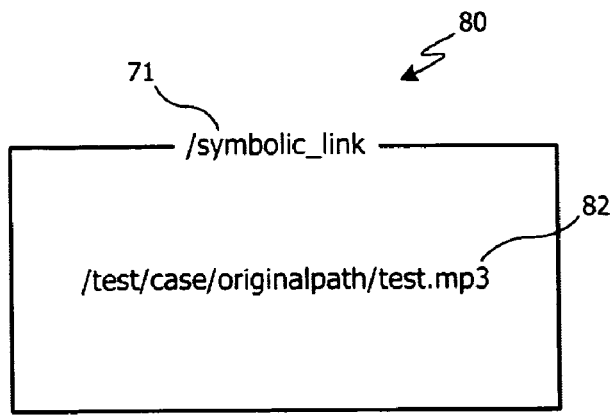
FIG. 5 is a diagram showing another example of the symbolic link file.

Meanwhile, as shown in FIG. 5, a symbolic link file 80 may have an absolute path 82 as a file ("/test/case/originalpath/test.mp3"). As such, aliasing of an absolute path can be performed using a symbolic link path, regardless of whether or not the absolute path 82 indicates a directory or a file.

Figure 6:
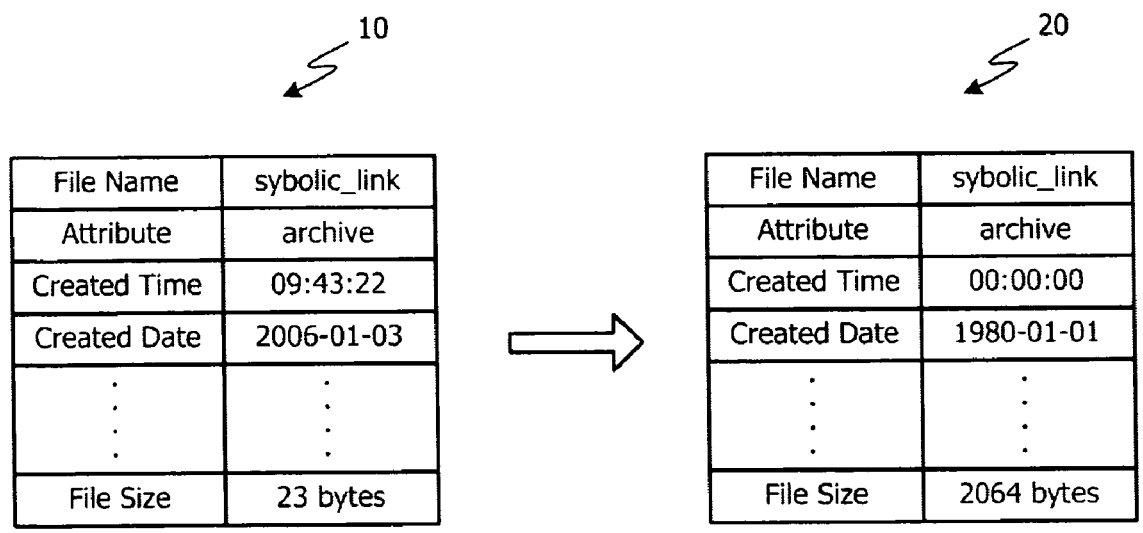
FIG. 6 is a diagram showing an example where the content of the directory entry is changed by an attribute recording unit.

The attribute recording unit 140 records an attribute indicating that it is a symbolic link file in a directory entry of the symbolic link files created by the link file creating unit 150. FIG. 6 shows a process of recording an attribute in a directory entry. In a directory entry 10 of a file that is created by the link file creating unit 150 and has a file name "symbolic_link", meta data, such as a file name, attribute, created time/date, or file size, is recorded. At this time, the created time/date and the file size recorded in the directory entry 10 are the same as the actual created time/date and the file size of the symbolic_link file.

In order to identify a symbolic link file, the attribute recording unit 140 changes the created date/time and the file size from the meta data to predefined values, respectively. For example, the created date/time is changed to Jan. 1, 1980, 00:00:00 and the file size is changed to 2064 bytes. Of course, the symbolic link file may be identified using one of the created date/time and the file size or the symbolic link file may be identified using one of the created date and time. However, for accurate identification, it is desirable to change both the created date/time and the file size into the specified values, as shown in FIG. 6.

If the user inputs the access (read or write) command to the specified file or directory, the attribute reading unit 160 checks the directory entry of the file or directory so as to judge whether or not the corresponding file or directory is a symbolic link file. At this time, the attribute reading unit 160 checks whether or not the created date/time or the file size of the directory entry has a specified value. If the created date/time or the file size of the directory entry has the specified value, the attribute reading unit 160 judges that the file or directory is a symbolic link file. Otherwise, the attribute reading unit 160 judges that the file or directory is a general file.

When the attribute reading unit 160 judges that the file or directory is the symbolic link file, the path converting unit 170 converts the symbolic link path into an absolute path included in the symbolic link file and provides the converted absolute path to the control unit 120.

The control unit 120 controls the operations of other constituent blocks and controls the access to the file or directory. When the path converting unit 170 provides the converted absolute path, the control unit 120 accesses (reads or writes) the corresponding file or directory using the absolute path.

Figure 4:
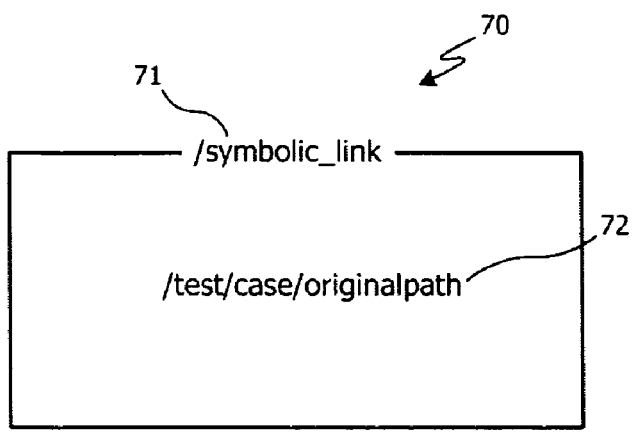
FIG. 4 is a diagram showing an example of a symbolic link file.

For example, it is assumed that the symbolic link file is set as shown FIG. 4. If the user inputs a command "delete/symbolic_link/hello.txt" (where "delete" is a file deletion command), the command is converted into "delete/test/case/originalpath/hello.txt" and provided to the control unit 120. Then, the control unit 120 deletes a file "hello.txt" on the corresponding path.

It is also assumed that the symbolic link file is set as shown in FIG. 5. If the user inputs a command "delete/symbolic_link", the command is converted into "delete/test/case/originalpath/test.mp3" and provided to the control unit 120. Then, the control unit 120 deletes a file "test.mp3" on the corresponding path.

Figure 7:
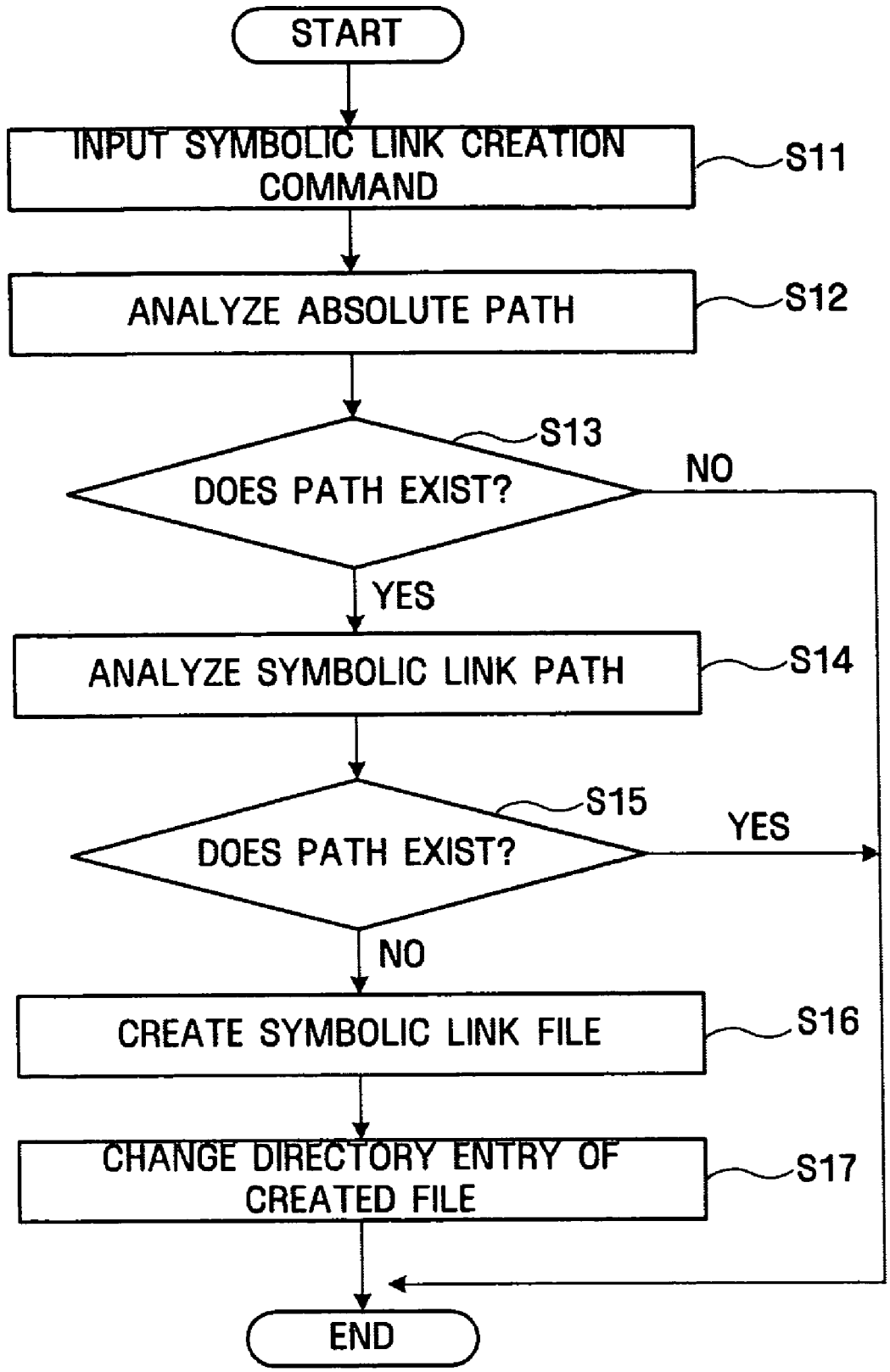
FIG. 7 is a flowchart showing a process of creating a symbolic link file according to an exemplary embodiment of the invention.

FIG. 7 is a flowchart showing a process of creating a symbolic link file according to an embodiment of the invention.

First, the user command input unit 110 receives the symbolic link creation command from the user (Step S11). The symbolic link creation command includes the symbolic link path and the absolute path corresponding to the symbolic link path.

Then, the path analyzer 130 analyzes the absolute path (Step S12) and judges whether or not the corresponding path exists (Step S13). If the corresponding path does not exist, there is no object to which the symbolic link should be set. Accordingly, the path analyze 130 displays an error message and then the process ends.

If the corresponding path exists (YES at Step S13), the path analyzer 130 analyzes the symbolic link path (Step S14). If the corresponding path exists (YES at Step S15), since there is an existing symbolic link, the path analyzer 130 displays an error message so as for the user to set another symbolic link and the process ends. At Step S15, it is judged that there is no corresponding path, the path analyzer 130 notifies the link file creating unit 150 to create a symbolic link file.

Then, the link file creating unit 150 creates a symbolic link file (Step S16). At this time, actual values are recorded for the created date/time and the file size of the directory entry of the created symbolic link file.

The attribute recording unit 140 changes one of the created date/time or the file size to a specified value so as to identify the symbolic link file (Step S117). Then, the process of creating a symbolic link file is completed.

Figure 8:
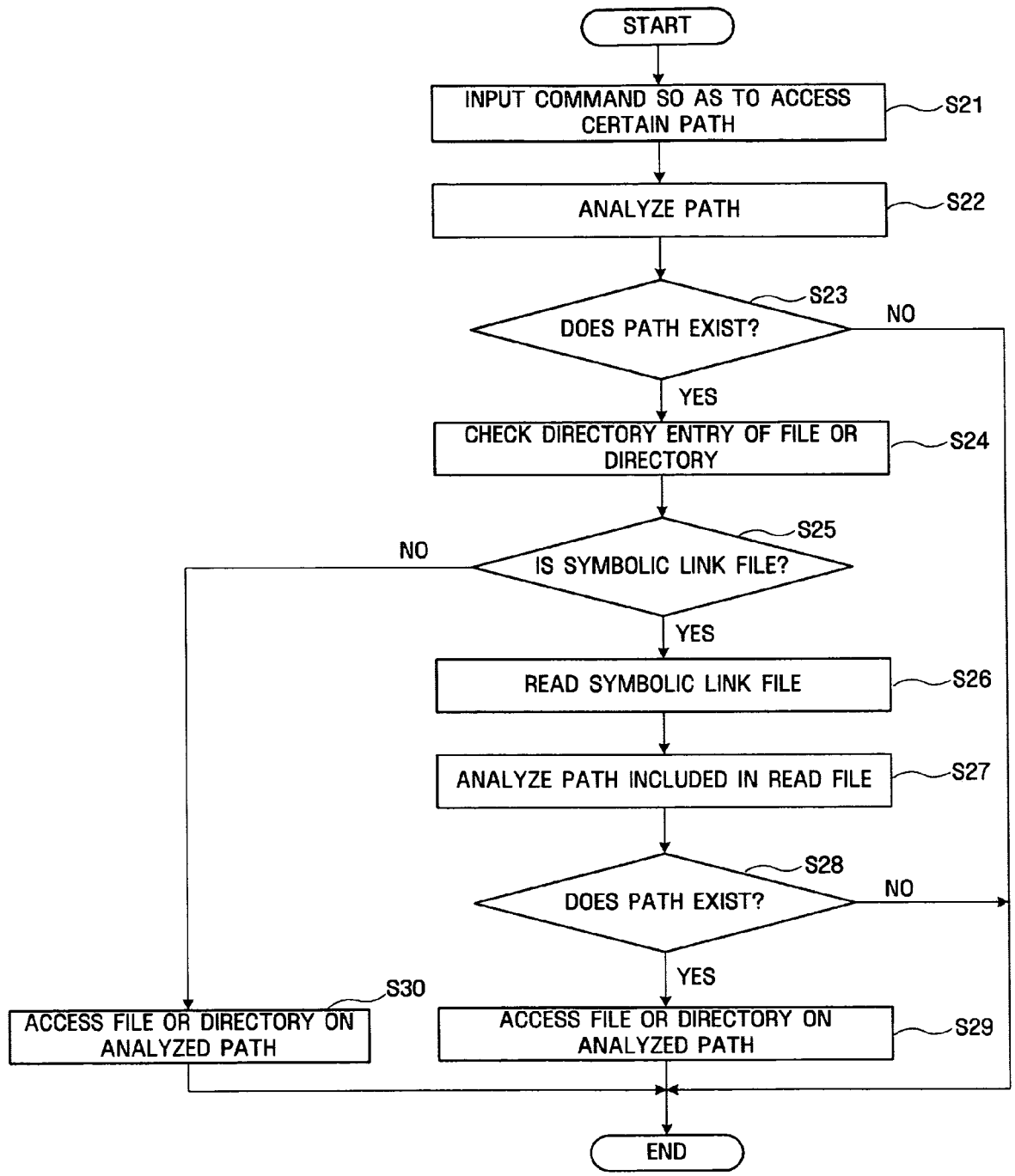
FIG. 8 is a flowchart showing an example of a process of accessing a specified file or directory after a symbolic link file is created, as shown in FIG. 7.

FIG. 8 is a flowchart showing an example of a process of accessing a file or directory after a symbolic link file is created, as shown in FIG. 7.

First, the user command input unit 110 receives an access command for a certain path (Step S21). This path points to a certain file or directory.

Then, the path analyzer 130 analyzes the absolute path (Step S22) and judges whether or not the corresponding path exists (Step S23). If the corresponding path does not exist (NO at Step S23), it is judged that the command is erroneously input. Then, the path analyzer 130 outputs an error message and then the process ends.

If the corresponding path exists (YES at Step S23), the attribute reading unit 160 checks a directory entry of a file or directory of the corresponding path. Specifically, a created date/time field or a file size field included in the directory entry is checked. If a specified value for identifying a symbolic link file is recorded in the created date/time field and/or the file size field, it is checked that the file or directory is a symbolic link file (YES at Step S25). If it is checked that the file or directory is not a symbolic link file (NO at Step S25), the control unit 120 accesses the file or directory corresponding to the path input by the user (Step S30).

If it is checked that the file or directory is a symbolic link file (YES at Step S25), the control unit 120 reads the symbolic link file (Step S26) and causes the path analyzer 130 to analyze the path (absolute path) included in the symbolic link file (Step S27).

The path analyzer 130 determines whether or not the path included in the symbolic link file exists (Step S28). If the path does not exist (No at Step S28), the path analyzer 130 outputs an error message to the user, and then the process ends.

If the path analyzer 130 judges that the symbolic link path exists (YES at Step S28), the control unit 120 accesses the file or directory corresponding to the path analyzed at Step S27 (Step S29).

The constituent elements of FIG. 3 can be implemented by software components, such as tasks, classes, subroutines, processes, objects, execution threads, or programs, that are executed in predetermined regions of a memory, or hardware components, such as a field programmable gate array (FPGA) and an application specific integrated circuit (ASIC). The constituent elements may be included in a computer readable storage medium or may be distributed into a plurality of computers.

Although aspects of the invention have been described in connection with the exemplary embodiments of the invention, it will be apparent to those skilled in the art that various modifications and changes may be made thereto without departing from the scope and spirit of the invention. Therefore, it should be understood that the above exemplary embodiments are not limitative, but illustrative in all aspects.

As described above, the invention can support a symbolic link function while keeping compatibility with the existing file system. Accordingly, it is possible to reduce inconvenience of a user caused by accessing a file or directory through an absolute path.

What is claimed is:

1. A method of creating a symbolic link in a file system having a directory entry without a symbolic link identification field, the method comprising:
   receiving a symbolic link creation command including an absolute path and a symbolic link path from a user;
   creating a symbolic link file in the file system for the symbolic link path if the absolute path exists; and
   changing a value of a created time field or a created date field in the directory entry of the created symbolic link file to a specified value indicating a symbolic link.

2. The method of claim 1, wherein the directory entry comprises a field in which a file name is recorded, a field in which a file attribute is recorded, a field in which a created date and time of a file are recorded, a field in which a last modified date and time of a file are recorded, and a field in which a file size is recorded.

3. The method of claim 1, further comprising, changing a value of a file size field in the directory entry of the created symbolic link file to another specified value indicating a symbolic link.

4. The method of claim 3, wherein the another specified value is a size of the longest path defined by the file system.

5. A method of accessing a file or directory using a symbolic link, which is created in a file system having a directory entry without a symbolic link identification field, the method comprising:
   receiving an access command to a path from a user;
   judging whether or not a value recorded in a created time field or a created date field of a directory entry in the file system with respect to a file or directory corresponding to the path is a specified value indicating a symbolic link;
   converting the path into a converted path included in a content of the file or directory in the file system if the created time field or the created date field of the directory entry is the specified value indicating the symbolic link; and
   accessing a file or directory in the file system corresponding to the converted path.

6. The method of claim 5, wherein the directory entry comprises a field in which a file name is recorded, a field in which a file attribute is recorded, a field in which a created date and time of a file are recorded, a field in which a last modified date and time of a file are recorded, and a field in which a file size is recorded.

7. The method of claim 5, further comprising, judging whether or not a value recorded in a file size field of the directory entry in the file system with respect to the file or directory corresponding to the path is another specified value indicating the symbolic link.

8. The method of claim 7, wherein the another specified value is a size of the longest path defined by the file system.

9. An apparatus for accessing a file or directory using a symbolic link created in a file system having a directory entry without a symbolic link identification field, the apparatus comprising:
   a user command input unit which receives an access command to a path from a user;
   an attribute reading unit which judges whether or not a value recorded in a created time field or a created date field of a directory entry in the file system with respect to a file or directory corresponding to the path is a specified value indicating a symbolic link;
   a path converting unit which converts the path into a converted path included in a content of the file or directory in the file system if the value recorded in the created time field or the created date field of the directory entry is the specified value indicating the symbolic link; and
   a processor which accesses a file or directory in the file system corresponding to the converted path.

10. The apparatus of claim 9, wherein the directory entry comprises a field in which a file name is recorded, a field in which a file attribute is recorded, a field in which a created date and time of a file are recorded, a field in which a last modified date and time of a file are recorded, and a field in which a file size is recorded.

11. The apparatus of claim 9, wherein the attribute reading unit judges whether or not a value recorded in a file size field of the directory entry in the file system with respect to the file or directory corresponding to the path is another specified value indicating the symbolic link.

12. The apparatus of claim 11, wherein the another specified value is a size of the longest path defined by the file system.

13. A tangible computer readable medium having embodied thereon a program, which when executed by a computer, causes the computer to execute a method of accessing a file or directory using a symbolic link, which is created in a file system having a directory entry without a symbolic link identification field, the method comprising:

receiving an access command to a path from a user;

judging whether or not a value recorded in a created time field or a created date field of a directory entry in the file system with respect to a file or directory corresponding to the path is a specified value indicating a symbolic link;

converting the path into a converted path included in a content of the file or directory in the file system if the value recorded in the created time field or the created date field of the directory entry is the specified value indicating the symbolic link; and accessing a file or directory in the file system corresponding to the converted path.

14. The computer readable medium of claim 13, wherein the directory entry comprises a field in which a file name is recorded, a field in which a file attribute is recorded, a field in which a created date and time of a file are recorded, a field in which a last modified date and time of a file are recorded, and a field in which a file size is recorded.

15. The computer readable medium of claim 13, the method further comprising, judging whether or not a value recorded in a file size field of the directory entry in the file system with respect to the file or directory corresponding to the path is another specified value indicating the symbolic link.

16. The computer readable medium of claim 15, wherein, the another specified value is a size of the longest path defined by the file system.

17. The method of claim 1, further comprising:

creating a directory entry of the symbolic link file, the created directory entry having fields containing values associated with the symbolic link file.

18. The method of claim 1, wherein the specified value of the specified field of the symbolic link indicates that the symbolic link is a symbolic link type file.

* * * * *